May 22, 1951 F. C. EASTMAN 2,553,852
APPARATUS FOR GRADING AND CHARTING SHOE LASTING WIPERS
Original Filed Sept. 29, 1944 6 Sheets-Sheet 1

Inventor
Fred C. Eastman
By his Attorney

Inventor
Fred C. Eastman
By his Attorney

May 22, 1951        F. C. EASTMAN        2,553,852
APPARATUS FOR GRADING AND CHARTING SHOE LASTING WIPERS
Original Filed Sept. 29, 1944        6 Sheets-Sheet 4

| A | B | C | D | E |
|---|---|---|---|---|
| 1:10 or .1 | .00625 | 10 | 20 | 15 |
| 2:10 .2 | .0125 | 5 | 10 | 7.5 |
| .3 | .01875 | 3.33 | 6.67 | 5 |
| .4 | .0250 | 2.5 | 5 | 3.75 |
| .5 | .03125 | 2.0 | 4 | 3 |
| .6 | .0375 | 1.67 | 3.33 | 2.5 |
| .7 | .04375 | 1.43 | 2.86 | 2.145 |
| .8 | .050 | 1.25 | 2.5 | 1.875 |
| .9 | .05625 | 1.11 | 2.22 | 1.665 |
| 1:1 1.0 | .0625 | 1.0 | 2.0 | 1.5 |

*Inventor*
Fred C. Eastman
By his Attorney

May 22, 1951  F. C. EASTMAN  2,553,852
APPARATUS FOR GRADING AND CHARTING SHOE LASTING WIPERS
Original Filed Sept. 29, 1944  6 Sheets—Sheet 5

Inventor
Fred C. Eastman
By his Attorney

Inventor
Fred C. Eastman
By his Attorney

Patented May 22, 1951

2,553,852

UNITED STATES PATENT OFFICE 2,553,852

APPARATUS FOR GRADING AND CHARTING SHOE LASTING WIPERS

Fred C. Eastman, Marblehead, Mass., assignor to United Shoe Machinery Corporation, Flemington, N. J., a corporation of New Jersey Original application September 29, 1944, Serial No. 556,417. Divided and this application October 21, 1948, Serial No. 55,748

5 Claims. (Cl. 33—76)

This invention relates to an apparatus for determining or selecting the number of sets of wipers such as are used in toe lasting machines, adapted to operate upon a selected range of sizes and widths of lasts of the same style. The apparatus illustrated herein is particularly adapted for use in practicing the method of selecting wiper sets set forth in a now abandoned application for Letters Patent of the United States, Serial No. 556,417, filed in my name on September 29, 1944 of which the present application is a division.

It is commonly known that in lasting the toes of shoes by lasting machines provided with wipers, different sets or pairs of wipers of different sizes and shapes are required for operating upon a certain run of sizes or widths of lasts of the same style. Heretofore, wipers to be used for a toe lasting operation on a certain run of sizes and widths of shoes, made on lasts of the same style, were made from last bottom patterns of such sizes and widths as past experience had proven as most acceptable. These sizes had become standardized to the extent that the same sizes and widths were chosen for pointed toe shoes and square toe shoes as were used for the more conventional shapes. This resulted in an excess of wipers produced for the pointed toe styles. On the other hand, an insufficient number of sets of wipers was produced for the wide square toe styles, where the width increment at the toe per size is greater, resulting in a poor quality of lasting on these styles. Also, for example, sets of wipers selected for operation on a certain run of sizes and widths of shoes of the pointed toe styles included two sets selected for operation upon different sizes which, although perhaps quite remote from each other, can be satisfactorily lasted by the same set of wipers.

It is, therefore, an object of the invention to determine the minimum number of wiper sets required in a toe lasting machine to operate properly upon a given number of sizes and widths of shoes of the same style. Another object of the invention is to determine the range of sizes and widths of shoes or lasts of the same style which may be satisfactorily operated upon by one and the same set of wipers.

The term "size," herein used, denotes the lengthwise extent of the bottom of a last or of the bottom of a shoe made on that last; the term "width" denotes the widthwise extent of said last bottom or shoe bottom, and the term "style" denotes the configuration or outline of said last bottom or shoe bottom, particularly the toe portion thereof. As is commonly known, size units are expressed in Arabic numbers, width units are expressed in capital letters and styles are mostly defined in descriptive terms such as "pointed toe" or "square toe" and others.

In accordance with one feature of the invention, the lengths of a predetermined toe line of a last bottom, the toe line being comparable in its general location and direction to the so-called tip seam line, and the ball line of that last bottom extending crosswise of the last bottom at the ball portion thereof are measured and the value of the angle, the tangent of which corresponds to the ratio of the lengths of the toe line and the ball line, is determined. Lines which are inclined relative to vertical lines through them at an angle corresponding to the above mentioned predetermined angle are then entered upon a table or chart. On this chart the last sizes are the ordinates and the last widths are the abscissae, and the selected range of sizes and widths of lasts to be operated upon has been marked on the table. The inclined lines are applied over the marked area of the table and are spaced apart a predetermined distance corresponding to the range of widths of lasts each particular wiper set as represented by an inclined line is adapted to operate upon. The number of inclined lines traversing the marked area of the table or chart determines the number of wiper sets required for a proper lasting operation upon the selected range of sizes and widths of shoes.

In accordance with another feature of the invention, there is provided a grading and charting device for use in determining the minimum set of wipers for the purpose above referred to. The device is provided with two gages, one to measure the toe line of the last bottom presented to the device and the other to measure the ball line of that last bottom. The two gages are connected together by an arm which is moved, on measuring movement of the gages, to a predetermined angular position corresponding in angularity to the above mentioned predetermined angle having its tangent corresponding to the toe line-ball line ratio.

These and other features of the invention are more specifically described hereinafter with reference to the accompanying drawings and are pointed out in the appended claims.

As has been stated, it is one of the objects of this invention to determine the minimum number of wiper sets adapted to operate upon a selected range of sizes and widths of shoes to be processed on lasts of the same style with the result that the selection of the proper wiper sets and particularly the determination of the minimum number of wiper sets for the stated task no longer is a matter of trial and error.

Figure 4:
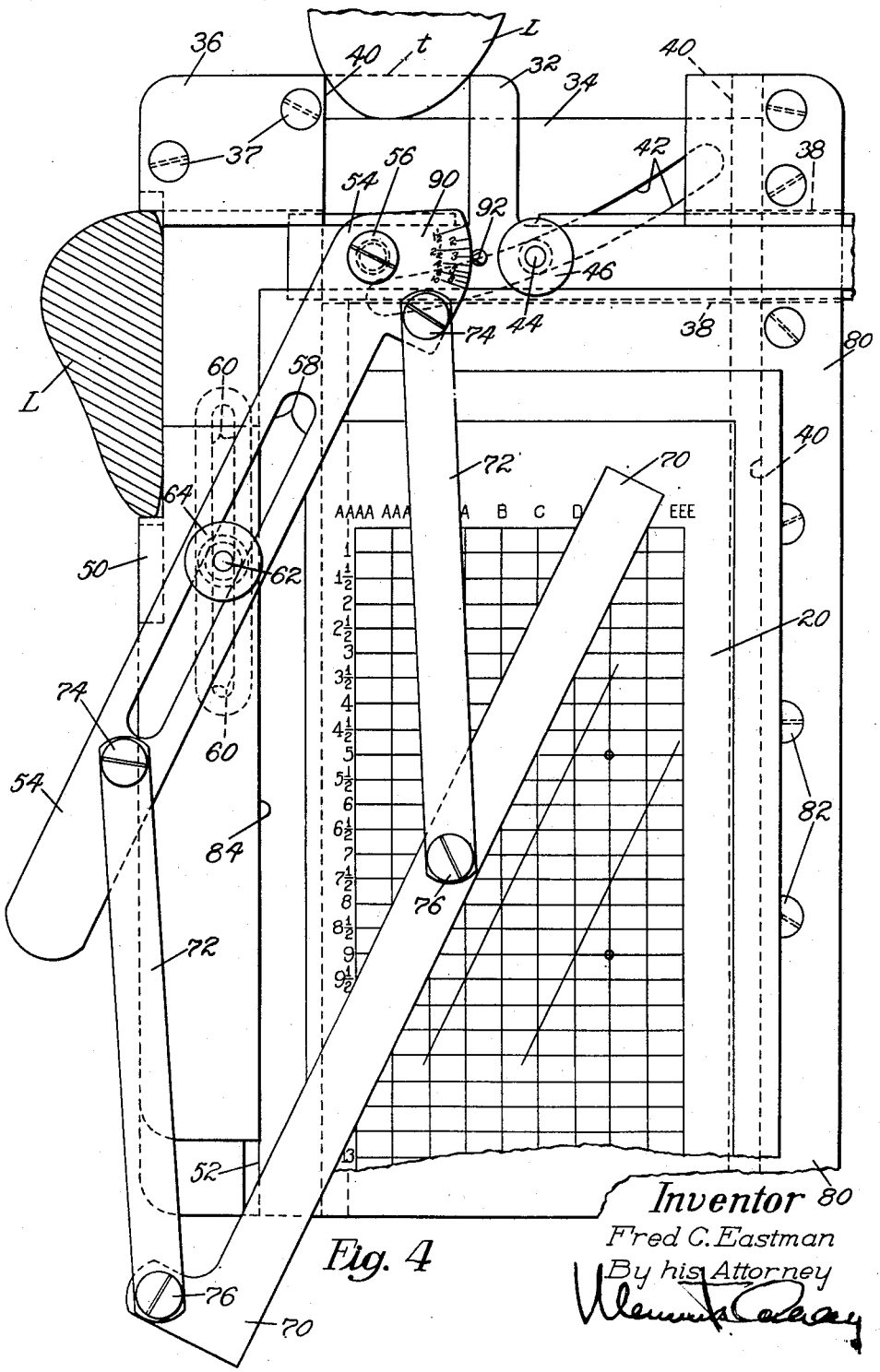
Fig. 4 is a plan of the device illustrated in Fig. 1 with its movable parts in gaging position, a chart having been presented to the device.
Figure 11:
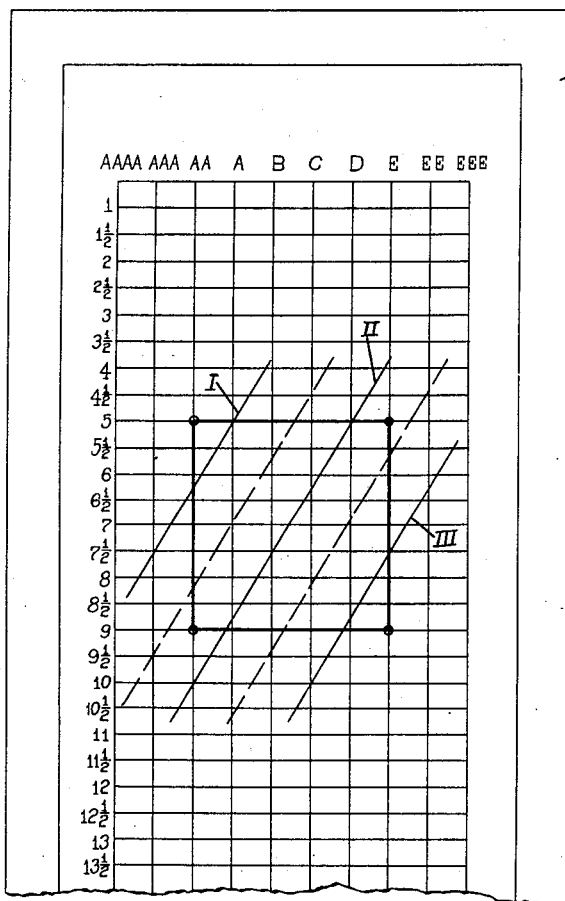
Fig. 11 is a plan of a chart or table on which are recorded the minimum number of wiper sets to be used for a given run of sizes and widths of shoes of the same style.

The solution of the problem underlying the present invention is predicated upon the fact that upon increase in the width of lasts of the same size (say from 8D to 8E), the ball line increases $\frac{1}{16}''$ in length. This increase may be termed the grading increment for width changes. Upon increase in the length or size of lasts of the same width (say from 8D to 9D), the ball line increases $\frac{1}{12}''$ in length. This increase may be termed the grading increment for length changes. The ratio of length increase to width increase, therefore, is 3:4. Based upon these facts a chart or table 20, such as illustrated in Figs. 4 and 11, may be made in which the widths of lasts running from AAAA to EEE are the abscissae and the lengths or sizes running from 0 to 14 are the ordinates. The distances between successive sizes and widths are in the ratio of 3:4.

Having done this the relationship or ratio of width changes and length changes may be recorded on the chart 20. While the ratios and related indicia may be manually established and recorded on the chart, it is preferred and more expedient to present the chart to the grading and charting device which is illustrated in Figs. 1 to 4 and which will be described. On the chart or table 20 indicia in the form of parallel lines of a predetermined slope or angle are entered. Each line represents a wiper set. The lines are spaced apart equal predetermined distances and the distance between two adjacent lines corresponds to the scope of each wiper set, that is to say, indicates how many widths of lasts of the same size and style may be satisfactorily operated upon by the same wiper set. The angularity of the parallel lines is dependent upon the particular style of the selected run of lasts as will be presently explained.

Figure 5:
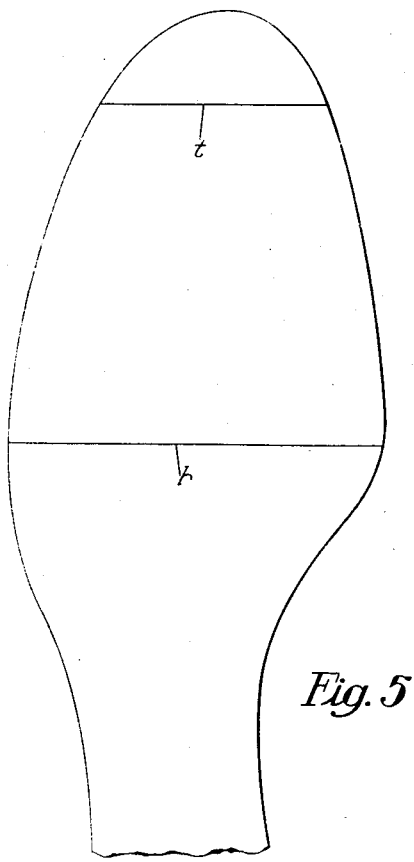
Fig. 5 is an outline of the forepart and shank portion of a sole or last bottom pattern showing the positions of the toe line and the ball line.

It has been found that a predetermined and determinable measuring line across the toe end of any last bottom (hereinafter called the toe line) and the ball line of the same last bottom are graded proportionally. This means that the lengths of the toe line and the ball line change proportionally between successive last width or last size changes. In the outline of the last bottom pattern or the sole of Fig. 5 the relative positions of the toe line $t$ and the ball line $b$ are illustrated. Their relation or ratio is diagrammaterially represented in Fig. 6. If, for example, the ball line measures $3''$ and the toe line measures $1.5''$ (ratio 2:1) an increase of $\frac{1}{16}''$ of the ball line results in a proportional increase of $\frac{1}{32}''$ of the toe line. Outside of the just mentioned toe line-ball line ratio of 1:2, there are numerous other ratios depending upon the numerous shoe styles, and the proportional width increments correspond to the ratio of each particular case.

Figure 6:
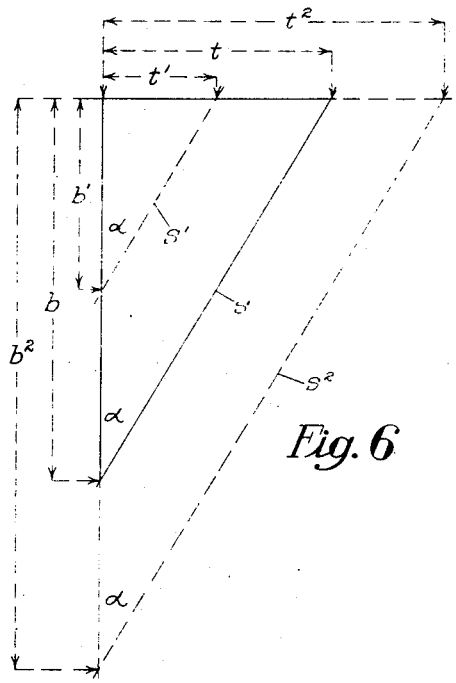
Fig. 6 is a diagram of toe lines and ball lines of different lengths but the same ratio.

Considering further Fig. 6 in which, as stated, the ratio between the toe line and ball line is illustrated graphically, it will be noted that Fig. 6 is a chart comprising principally a right angle, one leg of which represents the toe line $t$ and corresponds to it in length and the other leg of which respresents the ball line $b$ and is of the same length as the ball line. The straight line $s$ connecting the free ends of both legs of the right angle has a predetermined slope or angle $a$ and this slope remains the same for all sizes and widths of a given style having the same toe line-ball line ratio and proportional width increments. This is shown in Fig. 6 by illustrating graphically the relation between the proportionally smaller toe line $t'$ and proportionally smaller ball line $b'$ as well as the relation between the proportionally larger toe line $t^2$ and the proportionally larger ball line $b^2$. As will be noted the slope or angle $a$ of the connecting lines $s$, $s'$ and $s^2$ is the same or in other words the lines $s$, $s'$ and $s^2$ are parallel.

The just mentioned angle $a$ is determined either manually in the manner illustrated in Fig. 6 and entered upon the chart or table, or mechanically by means of the above mentioned grading and charting device. The construction and operation of this device is based upon the above explained principles.

The grading and charting device comprises a base plate 30 (Figs. 2 and 3) which is rectangular in plan. To determine and measure the toe line $t$ of a last L presented bottom down to the device, the latter is provided with two toe gages 32 and 34 (Figs. 1 and 4) which are in the form of slides and cooperate with a fixed abutment 36 secured by screws 37 to the base plate 30. As illustrated in Fig. 4 one corner of the abutment 36 engages one side of the toe portion of the last L. The gage 32 is manually movable in a rectilinear path to engage the opposite side of the toe portion of the last L, and the gage 34 is movable rectilinearly in a direction at right angles to the movement of the gage 32 so as to engage the toe end of the last.

To facilitate the movements of both gages 32 and 34 there are provided in the base plate 30 a slideway 38 (Figs. 1 and 4) extending crosswise of the device, in which slideway the gage 32 is movable, and a slideway 40 extending lengthwise of the device and at right angles to the slideway 38. The gage 34 is movable in the slideway 40. With the gages 32, 34 apart or in their open position, the last L is presented bottom down and toe portion foremost to the device with one side of its toe portion engaging the corner of the abutment 36, whereupon the gage 32 is moved to abut the opposite side of the last. The movement of the gage 32 produces a movement of the gage 34 and the extent of the movement of the gage 34 with relation to the gage 32 is predetermined. To this end there is provided in the gage 34 a slot 42 of predetermined curvature. A binding screw 44 extends with its stem through the slot 42 and through a hole in the gage 32. The head of the screw 44 rests against the under side of the gage 32 and straddles the slot 42. A thumb nut 46 is in threaded engagement with the portion of the screw 44 extending above the gage 32. When the thumb nut 46 is tightened the two gages 32 and 34 are locked together. Movement of the gage 32 with the thumb nut 46 backed off causes movement of the gage 34 as a result of the movement of the stem of the screw 44 along the slot 42. Movement of the gage 34 serves to locate the toe end of the last with relation to the grading and charting device. The toe line $t$ is determined when both gages 32 and 34 contact the last (see Fig. 4).

Figure 12:
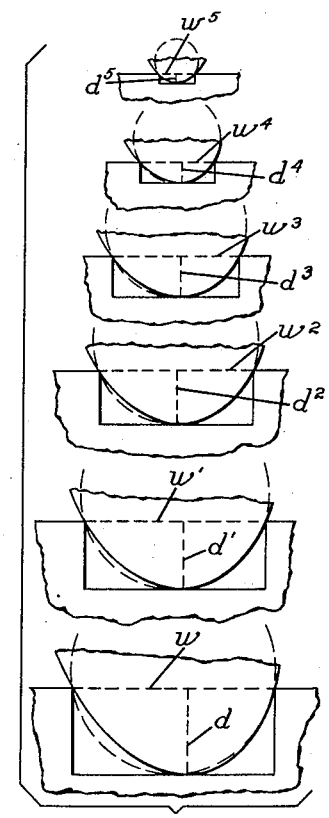
Fig. 12 shows the toe portions of a series of sole patterns of various sizes and styles to be measured for determining the curvature of a slot in one of the gages with which the device shown in Fig. 1 is provided.
Figure 13:
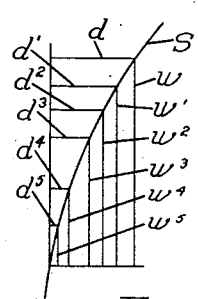
Fig. 13 is a chart on which the measurement values obtained in Fig. 12 are plotted.

The curvature of the slot 42 is determined as follows: Circles which fit or most nearly fit into the curvatures of the toe ends of a number of sole patterns of various sizes and styles are drawn on the patterns as illustrated in Fig. 12. The toe width $w$ of each pattern is then measured along a line between opposite points of intersection of the circle and the sides of the sole pattern, and the distance $d$ of this line from the toe end of the pattern also is recorded. These dimensions are plotted as illustrated in Fig. 13 and a curve S is drawn through the plotted points. The curve S is the same as the curve of the slot 42. After the determination of the curvature of the slot 42 it was found it so nearly approached the arc of a circle that in the practical use of the device a circular slot 42 which is easy to produce is entirely sufficient and satisfactory.

Having determined and measured the toe line $t$ of the last L which preferably is of a size and width somewhat in the middle of the selected range of sizes and widths, the setting of the gages 32, 34 is maintained by locking them together, which is done by tightening the thumb nut 46.

To measure the ball line $b$, the location of which on a last bottom or sole pattern is well known to last makers and shoe manufacturers, the illustrated device is provided with a manually movable gage 50 (Figs. 1 and 4) in the form of a slide which cooperates with another corner of the abutment 36. The last L is presented to the gage 50 with its toe portion pointing up and with its one side contacting, at the ball line, the last-mentioned corner of the abutment 36 whereupon the gage 50 is moved to engage the opposite side of the last at the ball line. To facilitate the movement of the gage 50 there is provided in the base plate 30 a slideway 52 which extends in the longitudinal direction of the base plate.

The gage 50 is connected with the gage 32 by an arm 54 pivotally secured at one end by a screw 56 to the gage 32. The arm 54 has a slot 58, and another slot 60 is provided in the bottom of the slideway 52. A binding screw 62 extends through both slots 58 and 60 and through a hole in the gage 50 and has its head resting against the under side of the base plate 30 and straddling the slot 60. The portion of the screw 62 extending upwardly above the arm 54 carries a thumb nut 64. A washer 68 (Fig. 3) is provided to fill the space between the stem of the screw 62 and the opposite sides of the slot 58 so as to prevent excessive looseness of the arm 54. The washer 68 is held in place by a flange on the lower end of the thumb nut 64. A ruler 70 (Figs. 1 and 4) is connected by parallel links 72 of equal length to the arm 54, the links 72 being pivotally secured at one end by screws 74 to the arm and being pivotally secured at the other end by screws 76 to the ruler. Thus the ruler 70 is constrained always to move in parallelism with the arm 54 which forms an extensible link between the movable ball line and toe line gages.

As will be noted upon movement of the gage 32, the link arm 54 is moved angularly about the center of the screw 62 the thumb nut 64 of which is backed off at that time. Movement of the gage 50 displaces the screw 62 along the slots 58 and 60, thereby imparting additional angular movement to the arm 54. In the final setting or gaging positions of the gages 32 and 50 the angularity or slope of the arm 54 corresponds to that of the lines $s$, $s'$, $s^2$ of Fig. 6. It is understood that after the gage 50 has been moved into its gaging position as determined by the last L, it is locked in that position by tightening the thumb nut 64 on the screw 62, thereby securing the gage 50 to the base plate 30.

Secured to the base plate 30 by screws 82 is also a flat support 80 (Figs. 1 and 4), the support 80 serving to carry the chart or table 20. Moreover, there is provided on the base plate 30 a ledge 84 extending lengthwise of the device and having a straight edge against which one edge of the chart is positioned. With the chart 20 in position, the ruler 70 can now be employed to draw a series of parallel lines on the chart 20, the lines corresponding in angularity to the slope of the arm 54.

Figure 1:
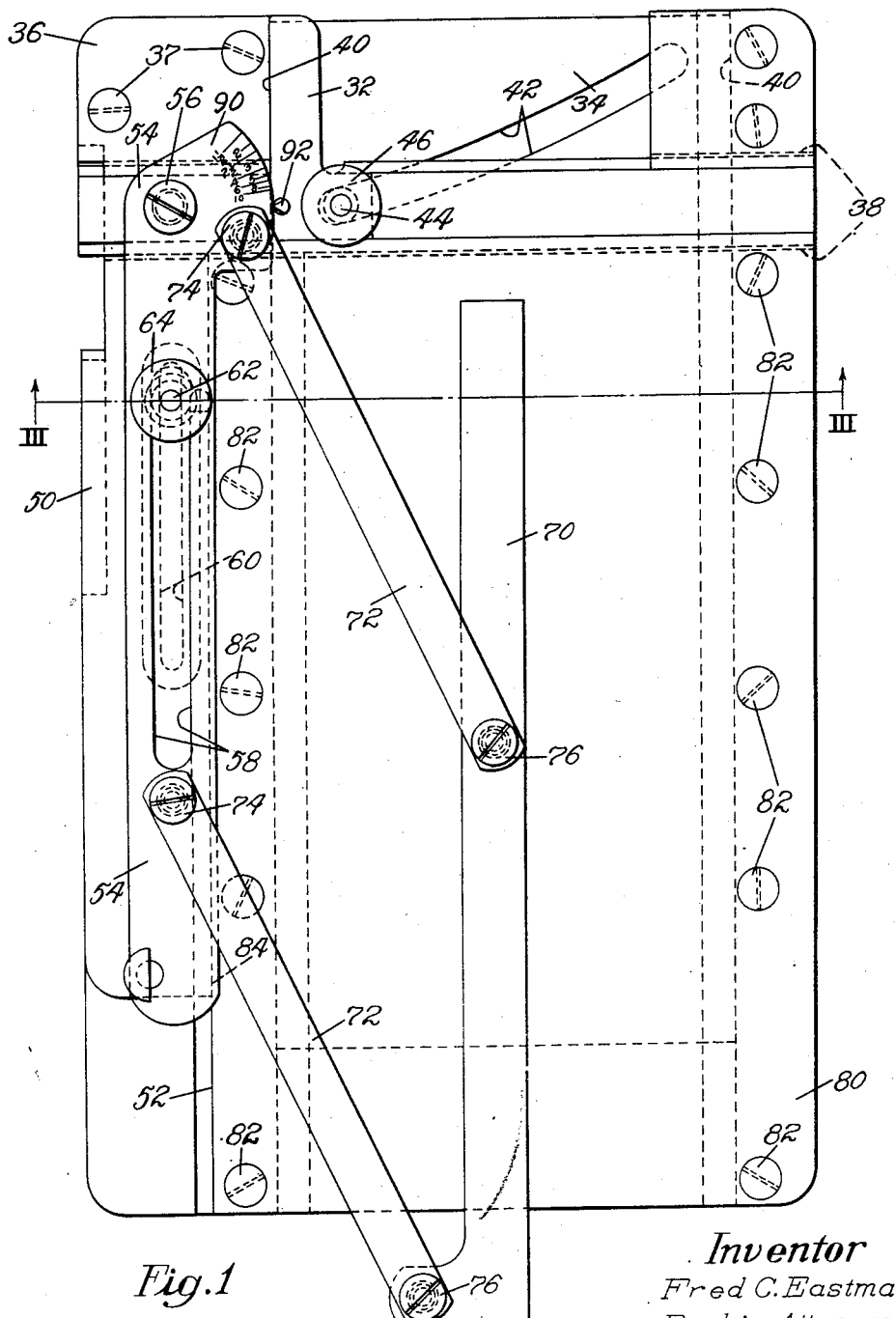
Fig. 1 is a plan of a grading and charting device with its movable parts in their inoperative initial positions.
Figure 2:
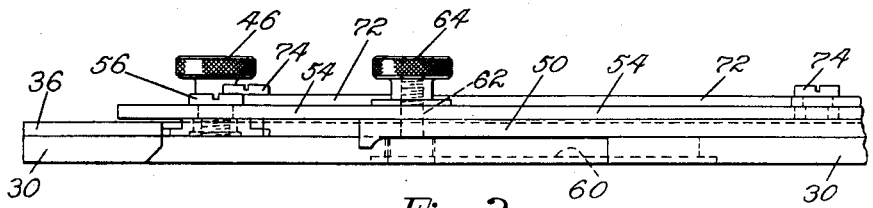
Fig. 2 is a left-hand side elevation of part of the device illustrated in Fig. 1.
Figure 3:
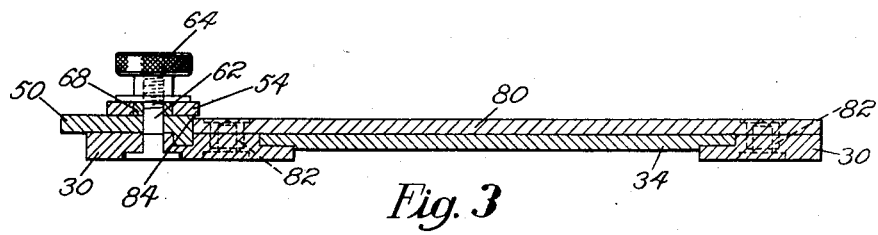
Fig. 3 is a section taken along the line III—III of Fig. 1.

As illustrated in Figs. 1 and 4 the arm 54 of the measuring and charting device has a transpivotal extention 90 in the shape of a segment on which is provided a scale of width zone increments running from 1½ to 10 and cooperating with an index member 92 secured on the gage 32. As will be noted, any angular movement of the arm 54 causes a movement of the width zone scale with relation to the index member 92. In a given angular position of the arm 54, the number of the scale opposite the index member 92 indicates the width zone increment or scope of a wiper in regard to its usefulness for operation on widths adjacent to the one it is to operate on.

The values for the width zone scale associated with the arm 54 are determined in the following manner: A hypothetical series of lasts is taken of which the toe line-ball line ratio ranges from 1:10 to 1:1 (.1 to 1.0). It was assumed that the width increments for successive wiper sets, or the so-called wiper grading, is $\tfrac{1}{16}''$. Thus the proportional width increment for each last of the series is $\tfrac{1}{16}''$ or .0625 (wiper grading) times the particular toe line-ball line ratio. A tabulation of the proportional last width increments is contained in Fig. 7 of the drawings. Column A shows the toe line-ball line ratios of the different lasts of the series ranging from .1 to 1.0. Column B contains the various proportional width increments for each last of the series. The width zone values for the scale are then obtained by dividing $\frac{1}{16}''$ or .0625 (wiper grading) by each proportional last width increment (column B), thus obtaining the values in column C which are the width zone values based on a $\frac{1}{16}''$ wiper grading. After these values in column C had been obtained it was found by making actual tests that this resulted in the provision of more wiper sets than are necessary for operating upon a given run of sizes and widths of shoes. Consequently a column D was tabulated in which the values are based on a wiper grading of $\frac{1}{8}''$. The tabulation of column D is simple because its values are practically double those of column C. Having obtained the width zone values for a wiper grading of $\frac{1}{8}''$ it was found that this resulted in not enough sets of wipers being provided for a satisfactory operation on a given run of sizes and widths of shoes. Thus a middle course was taken based on a wiper grading of $\frac{3}{32}''$, the values for which were tabulated in column E and lie in the middle between the values of columns C and D.

Figures 7, 8:
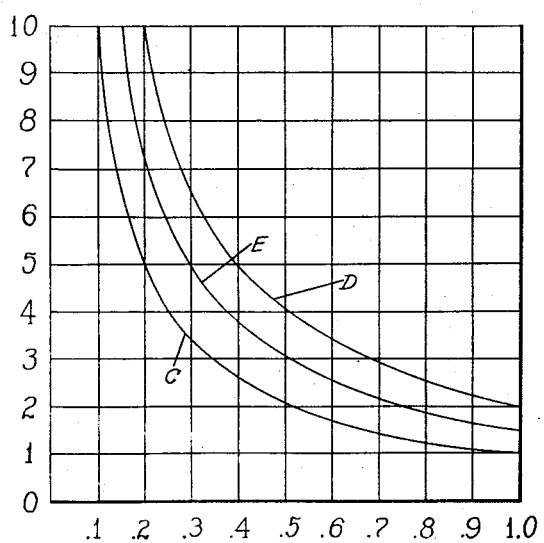
Fig. 7 is a table compiled for use in constructing a scale indicating the width zone increments, the scale being used in connection with the device illustrated in Fig. 1.
Fig. 8 is a chart showing curves plotted from values obtained in Fig. 7.

With the values of columns C, D and E established, curves may be plotted as indicated in Fig. 8 of the drawings on a chart in which the abscissae are the toe line-ball line ratios ranging from .1 to 1.0 and the ordinates are marked from 0 to 10, the separation of the ordinates being the same as that of the abscissae.

Figure 9:
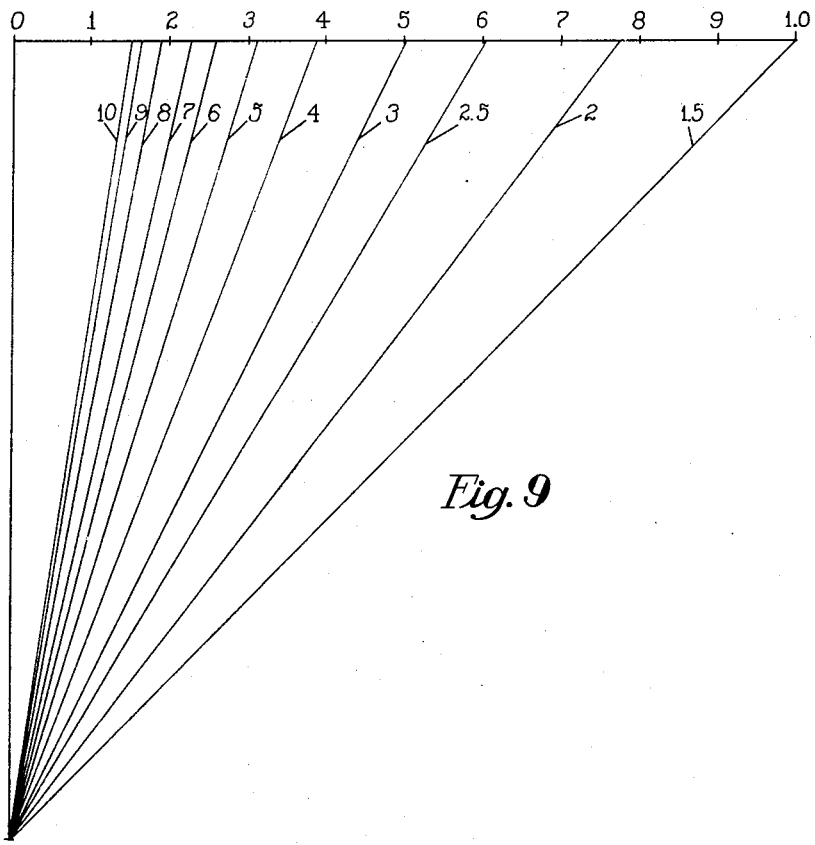
Fig. 9 illustrates how angles corresponding to a series of fixed values of the width zone scale may be plotted.
Figure 10:
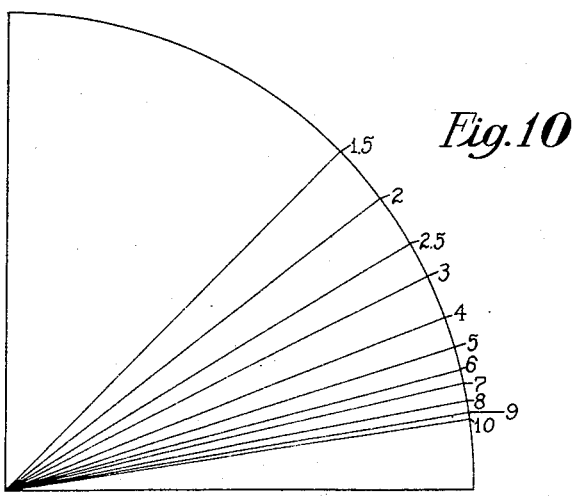
Fig. 10 shows how with the aid of the angular values determined by Fig. 9 the width zone scale may be constructed.

Based on the width zone values E for a wiper grading of $\frac{3}{32}''$, a chart as illustrated in Fig. 9 of the drawings is now prepared to determine the angles for the different values of column E of Fig. 7 or the corresponding curve E of Fig. 8. The chart illustrated in Fig. 9 comprises two lines of equal length disposed at right angles to each other. The horizontal line signifies the ratios and is divided into ten equal units running from 0, .1, .2, etc., to 1.0. Taking now the values obtained for column E in Fig. 7 or curve E in Fig. 8 or where these values were too fractional, taking the nearest integers or simple fractions, lines of different slopes all originating with the free end of the vertical line of the chart illustrated in Fig. 9 were drawn to different points of the horizontal line of that chart, these points being the corresponding toe line-ball line ratio values represented either by column A of the table of Fig. 7 or by the ordinates of the chart of Fig. 8. Integers or simple fractions for column E values are used in preference in order to simplify the reading of the width zone scale of the grading and charting device. All there was left to do was to measure the angles obtained on the chart of Fig. 9 and enter graduations on a segmental width zone scale diagrammatically shown in Fig. 10, of corresponding angularities and corresponding values. The angle values, of course, could also have been determined mathematically.

Let us assume now that the minimum number of wiper sets is to be determined for properly lasting the toes of shoes of the same style ranging in size and width from 5AA to 9E. A length-width table 20 as illustrated in Fig. 11 is marked by a rectangle including all sizes and widths in the selected range of 5AA to 9E. The chart is then inserted in the grading device as illustrated in Fig. 4 with the side ordinates parallel to the ledge 84 of the device and the measurement is preferably made with a last of a size and width lying approximately in the middle of the selected range of sizes and widths, say for example 7B. The first measurement taken, as explained, is that of the toe line $t$, after which the gages 32 and 34 are locked in their gaging positions. Then the length of the ball line $b$ is taken and the gage 50 is immobilized. As a result the arm 54 is set at a predetermined angle or slope as indicated in Fig. 4. The arm 54 in being moved angularly to a predetermined position, moves the width zone scale on the segment 90 relatively to the index member 92. In the final setting, the width zone scale indicates the width zone increment corresponding to the particular toe line-ball line ratio. Parallel lines corresponding in angularity to that of the arm 54 may now be drawn with the aid of the ruler 70 through the rectangle marked on the table or chart 20, and these lines are spaced apart a distance corresponding to the particular width zone value indicated on the scale. As shown in Fig. 4 in the particular setting of the arm 54, the corresponding width zone value is 3, indicating that the parallel lines drawn across the rectangle marked on the chart of Fig. 11 are to be spaced apart 3 last widths. Preferably these lines are so placed with relation to the marked rectangle of the chart of Fig. 11, that they do not extend through the corners of the rectangle, but that the corners of the rectangle fall within the width zones of the nearest lines. The dash lines drawn through the marked rectangle of the chart of Fig. 11 indicate the lateral limits of scope of each set of wipers indicated by the full lines I, II, III.

For the selected range of sizes and widths of lasts to be operated upon, three consecutive sets of wipers are therefore sufficient as indicated by the chart of Fig. 11. An analysis of the range of operation of each of the three wiper sets I, II, III made in accordance with the chart of Fig. 11 is as follows:

| 1st Wiper Set | 2nd Wiper Set | 3rd Wiper Set |
| --- | --- | --- |
| 5AA–5B | 5C–5E | 6E. |
| 5½AA–5½B | 5½C–5½E | 6½E. |
| 6AA–6A | 6B–6D | 7D–7E. |
| 6½AA–6½A | 6½B–6½D | 7½D–7½E. |
| 7AA | 7A–7C | 8D–8E. |
| 7½AA | 7½A–7½C | 8½C–8½E. |
| 8AA | 8A–8C | 9C–9E. |
| | 8½AA–8½B | |
| | 9AA–9B | |

Having thus described my invention, what I claim as new and desire to secure by Letters Patent of the United States is:

1. A measuring and charting device for use in determining the minimum number of wiper sets adapted to operate upon a selected range of sizes and widths of lasts of the same style, having a base, a toe line gage for determining the length of the toe line of a last, a ball line gage for determining the length of the ball line of said last, each of said gages being slidably positioned upon said base for independent rectilinear movements in paths at right angles to each other, an extensive link pivotally connected between both gages, said link being moved to a predetermined angular position on measurement of the toe line and the ball line of the last by said gages, and a ruler controlled by said link and movable over a table presented to the device, the ruler being located in a predetermined angular position with relation to said table upon the setting of said link.

2. A measuring and charting device for use in determining the minimum number of wiper sets adapted to operate upon a selected range of sizes and widths of lasts of the same style, having two gages movable at right angles to each other and movable with relation to a fixed abutment for one corner of the toe portion of a last bottom, the gaging movement being terminated by the engagement of one of said gages with the toe end of said toe portion and of the other gage with the side of said toe portion opposite to that engaged by said abutment, means connecting both gages and controlling the movement of one upon movement of the other, a ball line gage, means connecting the ball line gage with one of the first mentioned two gages, and a ruler controlled by said connecting means and movable over a table presented to the device, the ruler being located in a predetermined angular position with relation to said table upon setting of said connecting means by the last measuring action of said gages.

3. A measuring and charting device for use in determining the minimum number of wiper sets adapted to operate upon a selected range of sizes and widths of lasts of the same style, having a toe line gage for determining the length of a toe line of a last, a ball line gage for determining the length of the ball line of said last, an arm pivotally secured to the toe line gage and having a screw and slot connection with the ball line gage, the arm being moved to a predetermined angular position on measuring the toe line and the ball line of the last by said gages, and a width zone gage on said arm, movable with relation to an index member on the toe line gage upon movement of the arm, to determine the width zone value for a setting of the gages and the arm in accordance with the ratio of the toe line and the ball line.

4. A measuring and charting device for use in determining the minimum number of wiper sets adapted to operate upon a selected range of sizes and widths of lasts of the same style, having a toe line gage for determining the length of the toe line of a last, a ball line gage for determining the length of the ball line of said last, an arm pivotally secured to the toe line gage and having a slot extending lengthwise thereof, the slot being engaged by a member carried by the ball line gage to cause angular movement of the arm upon rectilinear movement of the ball line gage, and a segmental extension on said arm having a width zone scale, movable with relation to an index member on the toe line gage upon movement of the arm, to determine the width zone value for a setting of the gages and the arm in accordance with the ratio of the toe line and the ball line.

5. A measuring and charting device for use in determining the minimum number of wiper sets adapted to operate upon a selected range of sizes and widths of lasts of the same style, comprising a base, a gage movable with relation to said base to engage the side of the toe portion of a last presented to the device, another gage movable with relation to the first mentioned gage to engage the toe end of said last, a curved slot in one of said gages, a screw carried by the other gage and engaging said slot to produce movement of one gage upon movement of the other so as to determine the length of the toe line of the last and to set the gages in accordance with the length of said toe line, a ball line gage movable with relation to said base to determine the length of the ball line of said last, and an arm pivotally secured to the first mentioned gage and having a screw and slot connection with the ball line gage, the arm being moved to a predetermined angular position on measurement of the toe line and the ball line by said gages.

FRED C. EASTMAN.

REFERENCES CITED

The following references are of record in the file of this patent:

UNITED STATES PATENTS

| Number | Name | Date |
| --- | --- | --- |
| 1,644,075 | Morse | Oct. 4, 1927 |
| 2,181,930 | Wheeler | Dec. 5, 1939 |
| 2,326,820 | Bliss | Aug. 17, 1943 |